United States Patent
Bates et al.

(10) Patent No.: US 8,037,454 B2
(45) Date of Patent: *Oct. 11, 2011

(54) METHOD OF GENERATING AND UTILIZING DEBUG HISTORY

(75) Inventors: Cary L. Bates, Rochester, MN (US); Paul R. Day, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 924 days.

This patent is subject to a terminal disclaimer.

(21) Appl. No.: 12/023,765

(22) Filed: Jan. 31, 2008

(65) Prior Publication Data

US 2008/0127098 A1 May 29, 2008

Related U.S. Application Data

(63) Continuation of application No. 10/769,231, filed on Jan. 30, 2004, now Pat. No. 7,343,588.

(51) Int. Cl.
*G06F 9/44* (2006.01)
(52) U.S. Cl. .......... 717/124; 717/128; 717/131
(58) Field of Classification Search .......... 717/128, 717/131
See application file for complete search history.

(56) References Cited

U.S. PATENT DOCUMENTS

| | | | | |
|---|---|---|---|---|
| 5,778,230 A | * | 7/1998 | Wimble et al. | 717/131 |
| 5,940,617 A | * | 8/1999 | Tamura | 717/128 |
| 6,026,362 A | * | 2/2000 | Kim et al. | 705/317 |
| 6,077,312 A | | 6/2000 | Bates et al. | |
| 6,141,791 A | | 10/2000 | Takuma et al. | |
| 6,367,034 B1 | | 4/2002 | Novik et al. | |
| 6,418,543 B1 | | 7/2002 | Goli et al. | |
| 6,854,073 B2 | | 2/2005 | Bates et al. | |
| 6,988,262 B1 | * | 1/2006 | Mallory et al. | 717/127 |
| 7,096,458 B2 | | 8/2006 | Bates et al. | |
| 7,512,934 B2 | * | 3/2009 | Gatlin et al. | 717/127 |

OTHER PUBLICATIONS

Kappel et al., "A Tool for Debugging Active Database Behavior", 2001.*
Cheung et al., "A Study of Distributed Debugging", 1987, ip.com.*
Tietjen et al., "Method and Apparatus for Blocking a Task", 2002, ip.com.*

* cited by examiner

*Primary Examiner* — Wei Zhen
*Assistant Examiner* — Phillip Nguyen
(74) *Attorney, Agent, or Firm* — Patterson & Sheridan, LLP

(57) ABSTRACT

The present invention is generally directed towards providing a method, system and article of manufacture for generating and utilizing debug history to improve the debugging process. By providing facilities to store and retrieve debug history records for given events, the present invention allows developers to debug code more efficiently by allowing them to leverage information stored in a debug history repository. Further, the added functionality, related to the debug history, is available via modules that work in conjunction with existing debugger applications and is provided to users via a variety of interfaces including graphic interfaces and plug-in components.

23 Claims, 9 Drawing Sheets

FIG. 4A

```
dirhash.c int get_file_size( char *n, Hash_Table Hash )
{
    int i, j, key;
    Hash_Rec *ptr;
    key = 0;
    i = 0;
    while( n[i] != 0 )
    {
        key = key + (int) (n[i]);
        i++;
    }
    j + key % 101;
    while( ptr != 0 )
    {
        if ( strcmp ( ptr -> name, n ) == 0 ) return ( ptr -> size ) ;
        ptr = ptr -> next ;   ~401
    }
    return -1 ;
}

ERROR : POINTER NOT SET ~402
EVAL PTR ⟶ NEXT
⟹ ADD HISTORY ~403
```

HIRRARY DB

RECORD                                              441

| PGM : | DIR HASH AKE |
|---|---|
| MODULE : | DIR HASH |
| LINE : | 17 |
| STATE TYPE : | POINTER NOT SET ON EQUAL |
| VARIBLE : | PTR → NEXT |

DATA :

EVAL    PTR

EVAL    PTR = EMPTY REC

YOU CAN SET PTR EQUAL TO EMPTY REC WHEN THIS PROBLEM OCCURS

[ COMMIT ]   [ CANCEL ]
   442         443

FIG. 4D

```
dirhash.c int get_file_size( char *n, Hash_Table  Hash )
{
    int i, j, key ;
    Hash_Rec *ptr ;
    key = 0 ;
    i = 0 ;
    while( n[i] != 0 )
    {
        key = key + (int) ( n[i] ) ;
        i++ ;
    }
    j + key % 101 ;
    while( ptr != 0 )
    {
        if ( strcmp ( ptr -> name, n ) == 0 ) return ( ptr -> size ) ;
        ptr = ptr -> next ;      ~451
    }
    return -1 ;
}

ERROR : POINTER NOT SET  ~452
    EVAL PTR ⟶ NEXT
```

```
dirhash.c
int get_file_size( char *n, Hash_Table Hash )
{
    int i, j, key ;
    Hash_Rec *ptr ;
    key = 0 ;
    i = 0 ;
    while( n[i] != 0 )
    {
        key = key + (int) ( n[i] ) ;
        i++ ;
    }
    j + key % 101 ;
    while( ptr != 0 )
    {
        if ( strcmp ( ptr -> name, n ) == 0 )
        ptr = ptr -> next ;
    }
    return -1 ;
}
```

461 — EVAL PTR →
POINTER NOT SET ⇉

462

| Data |
|---|
| EVAL   PTR → |
| EVAL   PTR → EMPTY REC |
| COMMENTS<br>You can set ptr equal to<br>empty rec when this<br>problem occurs |

METHOD OF GENERATING AND UTILIZING DEBUG HISTORY

CROSS-REFERENCE TO RELATED APPLICATIONS

This is a continuation of U.S. patent application Ser. No. 10/769,231 filed Jan. 30, 2004, now U.S. Pat. No. 7,343,588 which is herein incorporated by reference.

BACKGROUND OF THE INVENTION

1. Field of the Invention

The present invention generally relates to data processing and more particularly to debugging computer programs.

2. Description of the Related Art

A programmer develops a software program by producing and entering source code into files using a text editor program. The computer then creates an executable program by translating the source code into machine code. The machine code is the rudimentary instructions understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Simply stated, debugging is the process of locating and identifying errors in a program under development. Typically, a programmer (also referred to as a "developer") uses another computer program commonly known as a "debugger" to help debug a program under development. An effective debugger program is necessary for rapid and efficient development of software and typically provides functions including run-to-cursor, step into, step over, step out of, and breakpoints.

While the foregoing conventional debugging tools are helpful, the practice of debugging remains a time consuming and tedious process that often turns into a drawn-out exercise of trial and error. For example, once the portion of code that is raising an un-monitored exception (or unexpected error) is identified, the cause of the error must be determined and a solution must be developed to surmount the error. For example, the error might be due to one of the program's variables being assigned an invalid value. The developer may have to execute the program numerous times with different values assigned to the variable before the correct value (or range of values) is found.

It should be noted that the piece of code being debugged can consist of thousands of lines, and there may be a large team of developers working on the program in a distributed environment. Often different developers may run into the same error at different times. Unfortunately, if the developers are unaware that a particular error has been encountered and solved previously, they may proceed with solving the same problem again; this is a waste of time and effort, unnecessarily incurring cost.

Therefore, there is a need for an improved debugger that provides users with the ability to generate and utilize a debug history in order to optimize the debugging process. Further, the debug history should be accessible via the debugger and should be capable of supporting a large group of users in a distributed environment.

SUMMARY OF THE INVENTION

The present invention generally relates to methods, apparatus and articles of manufacture for facilitating the use of debug history to optimize the debugging process.

For some embodiments, a computer-implemented method for debugging code generally includes providing a debugger comprising one or more interfaces for specifying debugger operations and displaying debug information, providing a debug history repository comprising a plurality of history records each containing data describing code state information for a previously-encountered given state of the code, providing access to the debug history repository via the debugger, and at a halted position in the code, determining whether a current state of the code matches a previously-encountered given state described in a history record in the debug history repository. If a matching debug history record exists, the computer-implemented method also includes providing a user an indication of the match via the one or more interfaces whereby the user is allowed to view debug information contained in the history record corresponding to the match, the debug information describing at least an aspect of the previously-encountered given state.

Another embodiment provides a computer readable medium containing a debugger program which, when executed, performs an operation to facilitate debugging of code. The operation generally includes collecting state information related to the current stopped position, querying a debug history repository to determine whether a current state of the code matches a given state described in a history record in the debug history repository, and if so, providing a user an indication of the match via the one or more interfaces.

Yet another embodiment provides a computer system for debugging code. The computer system generally includes a debug history repository comprising a plurality of history records each containing data describing code state information for a given state of the code under debug, a debugger comprising one or more interfaces for specifying debugger operations and displaying debug information. The debugger is configured to create the plurality of history records in the debug history repository, access the plurality of history records in the debug history repository, determine, at a given halted position in the code, whether a current state of the code matches a given state described in a history record of the plurality of history records, and if a matching state is determined, provide a user an indication of the match via the one or more interfaces whereby the user is allowed to view debug information contained in the history record corresponding to the match.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 4A-4F illustrate exemplary graphical user interface (GUI) screens in accordance with one embodiment of the present invention.

DETAILED DESCRIPTION OF THE PREFERRED EMBODIMENTS

Figure 1:
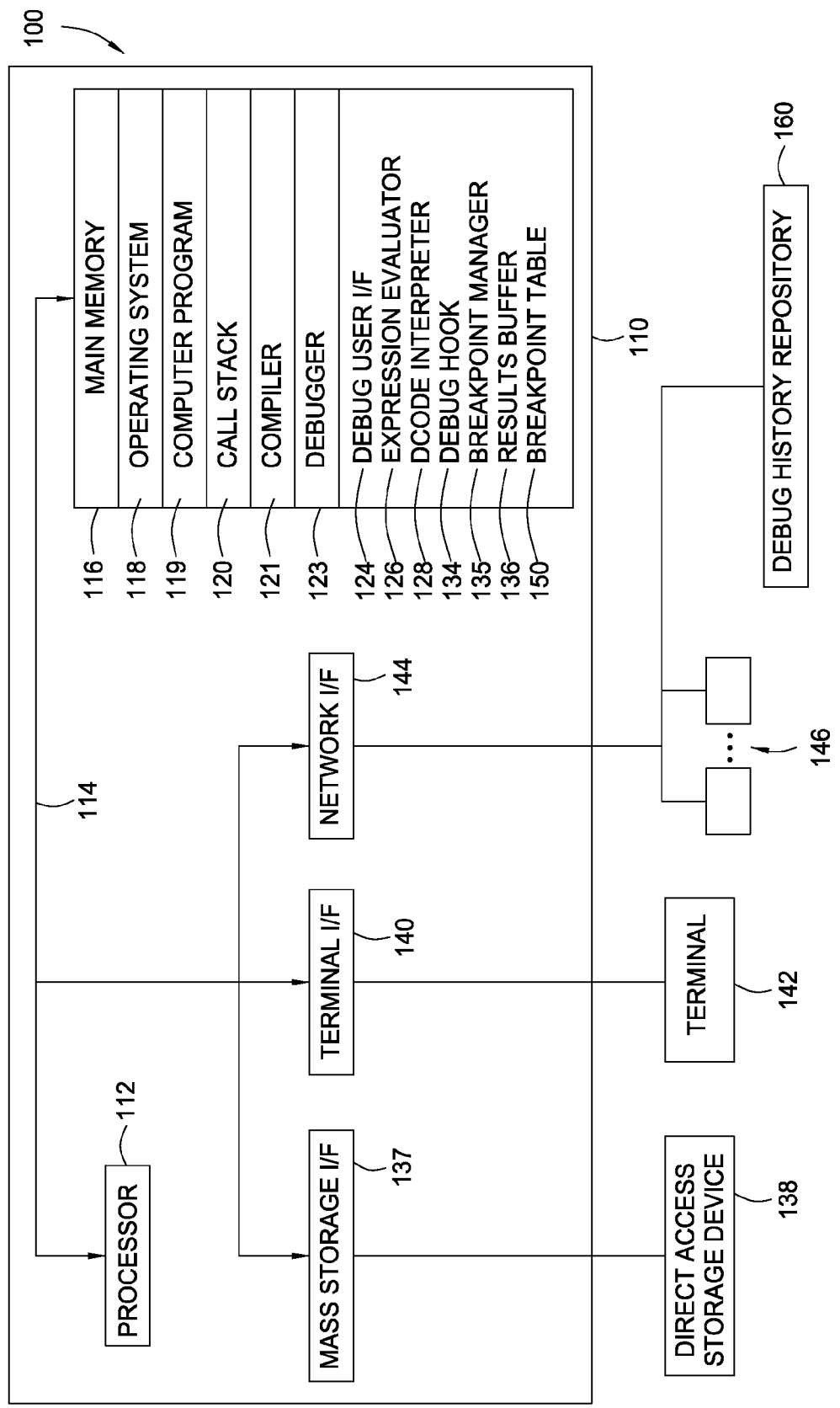
FIG. 1 is a high-level diagram of a computer, according to one embodiment of the present invention.

The present invention is generally directed towards providing a method, system and article of manufacture for generating and utilizing debug history to improve the debugging process. By providing facilities to store and retrieve debug history records for given events, the present invention enables developers to debug code more efficiently by allowing them to leverage information stored in a debug history repository. Further, the added functionality related to the debug history is available via modules that work in conjunction with existing debugger applications and is provided to users via a variety of interfaces including graphic interfaces and plug-in components.

As used herein, the term program generally refers to a set of coded instructions that enable a computer to perform a specified function. Plug-in components, analysis routines, functions or modules among other terms may constitute programs. Further, programs may be implemented internally or externally to a system, while remaining accessible by that system. While the following description and examples focus on debugging procedural programs, those skilled in the art will recognize the methods described herein may also be used with object oriented programs.

As used herein, the term user may generally apply to any entity utilizing the debugging system described herein, such as a person (e.g., an individual programmer or developer) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

As used herein, the term database generally refers to a collection of data arranged for ease and speed of search and retrieval. Further, a database comprises logical and physical structures. While the following description focuses on generating transaction statements for relational databases, those skilled in the art will recognize the methods described herein may be used with any type of database including an object-relational database and an XML-based database, where XML stands for "eXtensible-Markup-Language."

As used herein, the term state generally refers to the condition of the program, and the system on which the program is executed, at a point in time when the program is halted. For example, state information includes the name of the program running, position in the program (e.g., line number) at which the program has been halted, the specific scoped variables being evaluated, name of the developer, and the current time. Essentially, the state represents a snapshot of the computer system and the current program at a stopped position.

One embodiment of the invention is implemented as a program product for use with a computer system such as, for example, the computer 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In one aspect, the invention is particularly advantageous in the context of highly modular languages such as object-oriented programming languages including Java and C++. However, the use of object-oriented terminology is merely for convenience or illustration, and not limiting of the invention. Further, in some cases, different terms are used for the same or similar aspects of the invention. For example, in the claims appended below, the term "routine" or "function" may be used as a generic substitute for the term "method" to avoid any suggestion of that the invention is limited to particular object-oriented programming languages.

Referring now to FIG. 1, a computing environment 100 is shown. In general, the distributed environment 100 includes a computer system 110 and a plurality of networked devices 146. For simplicity, only the details of the computer system 110 are shown. However, it is understood that the computer system 110 may be representative of one or more of the networked devices 146. A debug history repository 160 is also presented as a networked device accessible via the network interface 144. In general, the computer system 110 and the networked devices 146 could be any type of computer, computer system or other programmable electronic device, including desktop or PC-based computers, workstations, network terminals, a client computer, a server computer, a portable computer, an embedded controller, etc.

Although shown networked into a larger system, the computer system 110 may be a standalone device. Moreover, those skilled in the art will appreciate that embodiments may be practiced with other computer system configurations including hand-held devices, multiprocessor systems, microprocessor-based or programmable consumer electronics, minicomputers, mainframe computers and the like. In a particular embodiment, the computer system 110 is an eServer® iSeries® 400 computer available from International Business Machines, Corporation of Armonk, N.Y. The embodiment may also be practiced in distributed computing environments in which tasks are performed by remote processing devices that are linked through a communications network. In a distributed computing environment, program modules may be located in both local and remote memory storage devices. In this regard, the computer system 110 and one or more of the networked devices 146 may be thin clients which perform little or no processing, but are coupled to a remote system that does the processing.

The computer system 110 could include a number of interfaces and peripheral systems as shown, for example, by a mass storage interface 137 operably connected to a direct access storage device 138, by a terminal interface 140 operably connected to a terminal 142, and by a network interface 144 operably connected to the plurality of networked devices 146. The terminal 142 may be any video output device for outputting viewable information.

Computer system 110 is shown comprising at least one processor 112, which obtains instructions, or operation codes (also known as opcodes), and data via a bus 114 from a main memory 116. The processor 112 could be any processor adapted to support the debugging methods, apparatus and article of manufacture of the invention. In particular, the computer processor 112 is selected to support the debugging features of the present invention. Illustratively, the processor is one of the Power® family of processors available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory on a mass storage device or storage capacity on another computer coupled to the computer system 110 via bus 114 or network interface 144.

As shown, the main memory 116 generally includes an operating system 118, a computer program 119 to be debugged, a call stack 120, a compiler 121, and a debugger program (the debugger) 123. The operating system 118 may be any system capable of managing the resources of the computer system 110, such as the OS/400® operating system. The computer program 119 represents any code that is to be examined, edited, compiled and/or debugged. The call stack 120 is associated with the computer program 119 and utilized by the operating system 118 during the execution of the program 119. The call stack 120 is a data structure that maintains information regarding the sequence of routines that are called during the execution of the computer program. Routines, which are often referred to as methods, procedures, and functions, are typically sequences of instructions or statements in a computer program that may be invoked to perform predetermined operations on a computer.

In one embodiment, the debugger 123 is a graphical user interface based debugger for the eServer iSeries computer. The OS/400 operating system and the eServer iSeries computer are available from International Business Machines, Corporation of Armonk, N.Y. Although the software constructs, such as the computer program 119 and the debugger 123, are shown residing on the same computer, a distributed environment is also contemplated. Thus, for example, the debugger 123 may be located on a networked device 146, while the computer program 119 to be debugged is on the computer system 110.

In a specific embodiment, the debugger 123 comprises a debug user interface 124, expression evaluator 126, Dcode interpreter 128 (also referred to herein as the debug interpreter 128), debugger hook (also referred to herein as a stop handler) 134, a breakpoint manager 135, a results buffer 136 and a breakpoint table 150. Although treated herein as integral parts of the debugger 123, one or more of the foregoing components may exist separately in the computer system 110.

Further, the debugger 123 may communicate with a debug history repository 160 via the network interface 144. The debug history repository may be implemented as a database containing debug information related to specific events. Users may be able to submit and extract debug information from the debug history repository 160 via the debug user interface 124.

Figure 2:
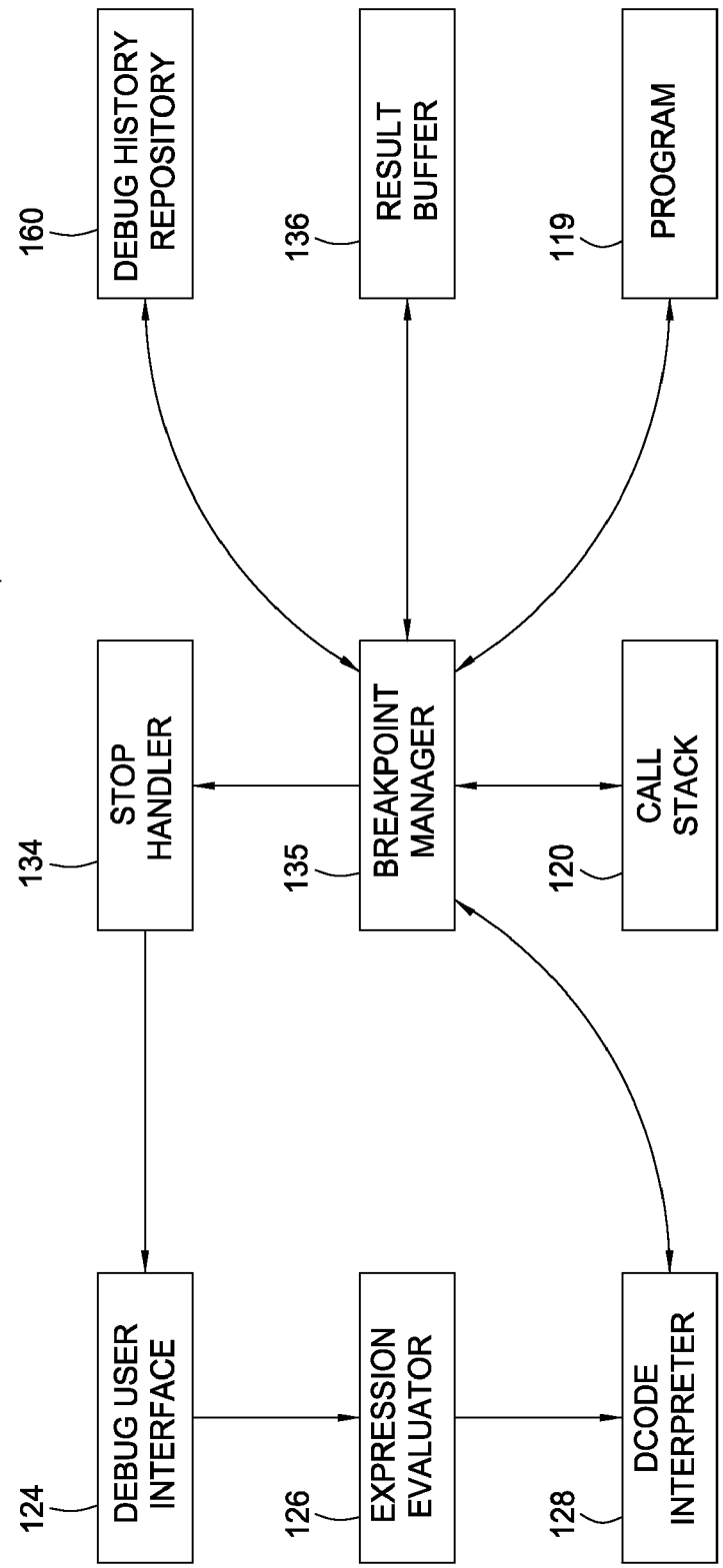
FIG. 2 is a block diagram illustrating the operation of a debugger and a debug history repository according to one embodiment of the present invention.

An illustrative debugging process is now described with reference to FIG. 2. A debugging process is initiated by the debug user interface 124. The user interface 124 presents the program being debugged and highlights the current line of the program on which a program stoppage occurs. The user interface 124 allows the user to set control points (e.g., breakpoints and watches), display and change variable values, and activate other features described herein by inputting the appropriate commands. In the embodiments of the invention, the debugger 123 automatically queries the debug history repository 160 based on the state of the program at the current stoppage. If a debug history record that corresponds to the current state exists, the debug user interface 124 allows users to view the contents of the record. If a history record does not exist, the debug user interface 124 allows users to build and submit a new history record.

The expression evaluator 126 parses the debugger command passed from the user interface 124 and uses a data structure (e.g., a table) generated by the compiler 121 to map the line number in the debugger command to the physical memory address in memory 116. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. Additionally, the Dcode interpreter 128 passes a replacement op code (i.e., bad operation code) for breakpoints to the program 119 to trigger processing of the breakpoint when the replacement op code is reached during execution of program 119. Breakpoint may be detected during execution of a program by placing a known invalid instruction in the program at a desired point so that an error results when the program reaches that instruction and causes an interrupt that is then processed by the debugger. Results from Dcode interpreter 128 are returned to the user interface 124 through the expression evaluator 126. In addition, the Dcode interpreter 128 passes on information to the debug hook 134, which takes steps described below.

After the commands are entered, the user provides an input that resumes execution of the program 119. During execution, control is returned to the debugger 123 via the debug hook 134. The debug hook 134 is a code segment that returns control to the appropriate user interface. In some implementations, execution of the program eventually results in an event causing a trap to fire (e.g., a breakpoint or watchpoint or other types of debugger control points is encountered). Inserting and managing special op codes that cause these traps to fire is the responsibility of the breakpoint manager 135. When a trap fires, control is then returned to the debugger by the debug hook 134 and program execution is halted. The debug hook 134 then invokes the debug user interface 124 and may pass the results to the user interface 124. The results may also be passed to the results buffer 136 to cache data for the user interface 124.

Alternatively, if debug history is available for the state associated with the stoppage described above, the user may choose to review pertinent information stored in the debug history repository 160. As explained above, users may access the debug history repository via the debug user interface 124. By referring to debug history records for given states, users may be able substantially accelerate the debugging process. For example, a history record may provide valuable information that is related to the evaluation of certain variables in the current state of the program; the debug history record's contents are based on information gathered during a previous debugging session related to the current state.

Figure 3:
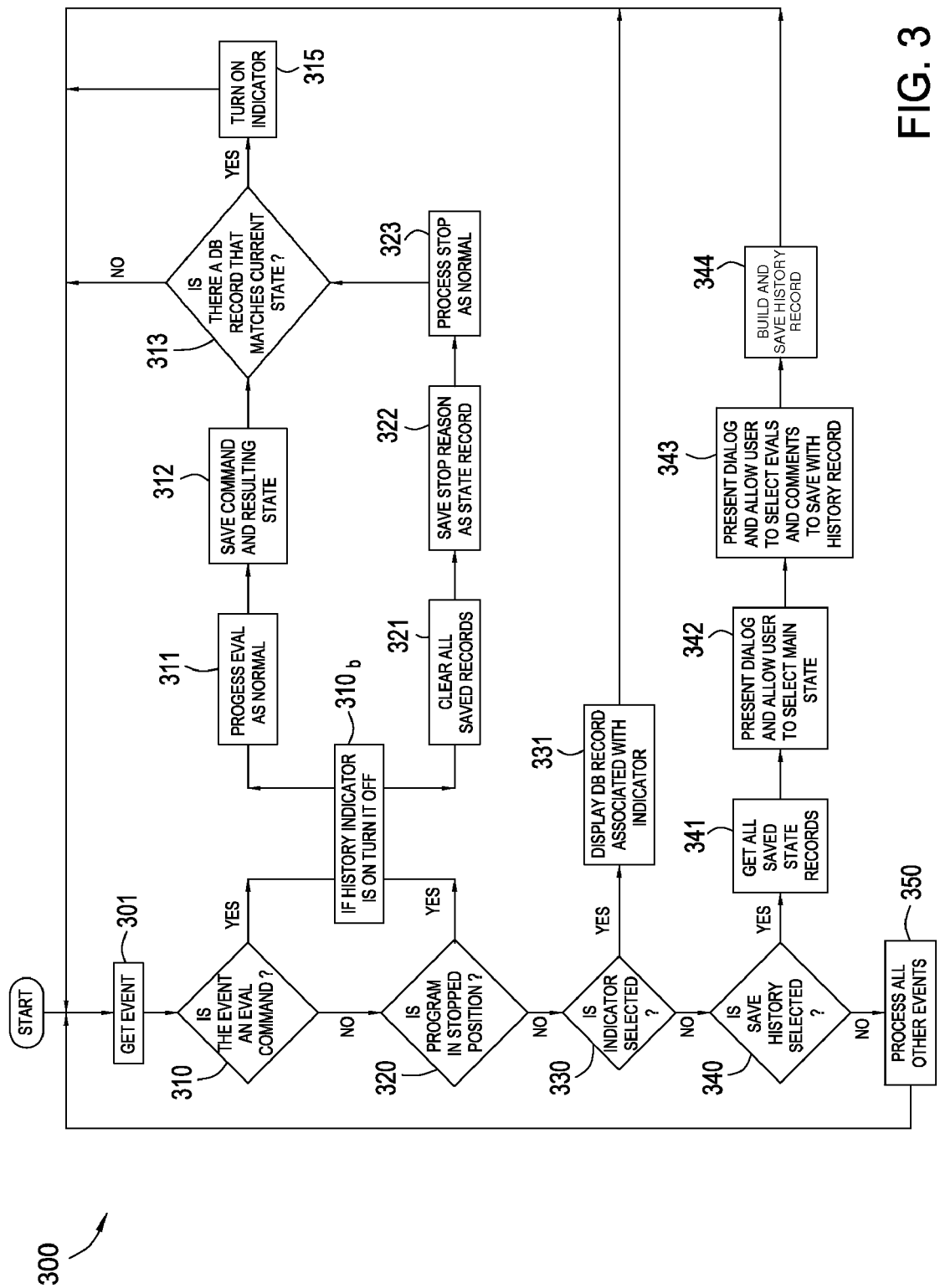
FIG. 3 is a flow chart illustrating exemplary operations for identifying and processing events for purposes of debugging code in accordance with one embodiment of the present invention. Events related to saving and presenting debug history records are among the events processed by the current invention.

FIG. 3 is a flow chart illustrating exemplary operations 300 for identifying and processing events for purposes of debugging code in accordance with one embodiment of the present invention. Events related to saving and presenting debug history records are among the events processed by the current invention. Operations 300 are a loop of operations performed for each event processed in a debugging session.

Four types of events are encountered and processed in accordance with the current invention: submission of an EVAL command, a program stoppage (planned or unplanned), submission of a user request to view debug history information (initiated by the user's selection of a history indicator), and submission of a user request to save debug history information (initiated by the user's selection of a save history icon).

The operations 300 begin at step 301, when an event related to the current program stoppage is identified. At step 310, a check is performed to determine if the event is an EVAL command. Among other functionality, an EVAL command allows for the viewing and setting of variable values during the debugging process. Next, a check is performed at step 310b to determine if the history indicator is already presented (or turned on) based on a previous event, rather than the current one; if this is the case, the indicator is turned off prior to processing the current event.

If the current event is an EVAL command, at step 311 the EVAL is processed as normal. After the EVAL command is processed, at step 312 attributes of the EVAL command (such as parameters and command string), and the resulting state are saved to a location (e.g., memory, buffer, or repository) that is accessible by the debugger. This saved information is also referred to as a temporary record. As expressed earlier, attributes of the state information include the name of the program, the position in code, name of the developer and the current time; the particular variables being evaluated and the EVAL command string itself are also saved. At step 313, the debugger automatically submits a query to the debug repository to determine if a debug history record matching the current state exists. If a matching record is found, at step 315 a history indicator is presented to the user via the debugger user interface. Upon presenting the history indicator, the next event (step 301) is processed. However, if a matching debug history record is not found at step 313, step 315 is skipped and the next event (step 301) is processed.

If it is determined at step 320 that the current event is a program stoppage, the debugger proceeds to performing a check at step 310b to determine if the history indicator is already turned on; if it is on, the indicator is turned off. During a program stoppage, the program is halted and the debugger is given control. A few types of program stoppages include debugger control points, such as breakpoints and watchpoints, and unmonitored exceptions. All existing buffered information related to previous events is cleared in preparation for the storing of data related to the current event at step 321. At step 322, the reason for program stoppage and the current state information is saved in a temporary record. Next, at step 323 the debugger proceeds with normal processing of the stoppage. Once the stoppage is processed, at step 313 the debugger automatically submits a query to the debug history repository to determine if a record that matches the current state exists. If a history record is not found, processing proceeds directly to the next event at step 301. Otherwise, if a record is found, the history indicator is turned on at step 315 prior to processing the next event.

At step 330, it is determined if the current event is the selection of the history indicator by the user via the debug user interface. In other words, a determination is made if the user has clicked the history indicator on a screen provided by the debugger. If the history indicator is selected, at step 331 contents of the debug history record corresponding to the current state are presented to the user via the user interface. As described above, the history indicator is available to users only if a debug history record matching the current state exists in the debug history repository.

At step 340, it is determined if the current event is the user's selection of the save history icon. The save history icon is available to the user if a debug history record does not exist for the current state, and the user desires to create a new record. At this point, the user probably has undergone an extensive debugging process involving the submission of multiple EVAL commands. Each EVAL command submitted during the debugging session, along with the corresponding state data, is stored in the temporary record. The following steps describe how the data stored in the temporary record is organized and submitted as a new record in the debug history database.

Upon confirmation that the save history icon has been selected, at step 341 all saved state information is identified. At step 342, the user is presented with a screen to select the main state. A variety of states might have been associated with the current debugging session. The user is given an opportunity to create a history record based on the state they feel is most pertinent to the current stoppage. Once the main state is selected by the user, at step 343 the user is presented with a screen containing all the EVAL statements submitted in the current session. Now the user is allowed to pick the relevant EVAL commands that need to be included in the debug history record. These EVAL commands, together with user supplied comments, will provide guidance towards analyzing states associated with the current stoppage. Finally, at step 344, the newly formed debug history record is formally inserted into the debug history repository. The above steps will be further clarified during the discussion of the exemplary GUI screens in later sections.

While steps 340-344 describe saving history based on the user's explicit direction, it should be understood that for some embodiments, the state information may be automatically collected and stored for the entire debug session. Accordingly, the user would not be required to select the save history icon; history records would be created by an automated process for each state.

If it is determined that the current event is not one of the aforementioned types of events associated with the current invention, the event is processed by other components of the debugger at step 350.

Exemplary GUI Screens

The effect of generating and utilizing debug history to improve the debugging process may be illustrated by the example GUI screens shown in FIGS. 4A-4F. The examples in FIGS. 4A-4F illustrate debugging sessions initiated after the occurrence of stoppages resulting from an unmonitored exception in a user program 119 called "dirhash.c."

FIG. 4A illustrates a screen from a debugger program. A program stoppage has occurred due to an unmonitored exception, also known as an error. A portion of the program's source code is presented and indicators are used to convey to users the location of the current error. In this example the specific point of failure is the "ptr=ptr->next;" statement 401. As determined by the debugger, this pointer is not set properly. Accordingly, an error message 402 stating the type of failure is provided. A query based on the current state is automatically submitted to the debug history repository by the debugger. The query results confirm that no matching debug history record exists; the user is prompted to "Add History" 403. Once a solution for the problem is determined, the user can initiate the creation of a record in the debug history repository by responding to the Add history prompt 403.

As described above, it should be noted that for some embodiments the collection of state information and creation of history records would occur automatically for the entire debug session. In this example, however, of history records is a manual process in which the user must respond to the add history prompt 403 in order for a history record to be created.

The user may now choose to commence with the debugging process by submitting several EVAL based commands. As described earlier, an EVAL is used to look at the value of a variable. It may also be used to manually assign values to program variables. For instance, in the current example, an EVAL command is used to determine that the error is caused by an incorrect value assignment for the variable ptr. Another EVAL command can be used to explicitly assign a new value to ptr in order to allow for the proper execution of the program. Unfortunately, a lengthy trial and error process may be required before the correct value can be determined. Below are some EVAL commands that may have been submitted for the current example:

EVAL ptr->name
EVAL ptr
EVAL ptr=EmptyRec

In this case, the error is caused by the setting of ptr->next, as reported by the debugger. Suppose that through trial and error, the user has determined that the problem can be identified by submitting EVAL ptr and can be overcome by submitting EVAL ptr=EmptyRec.

Figure 4B:
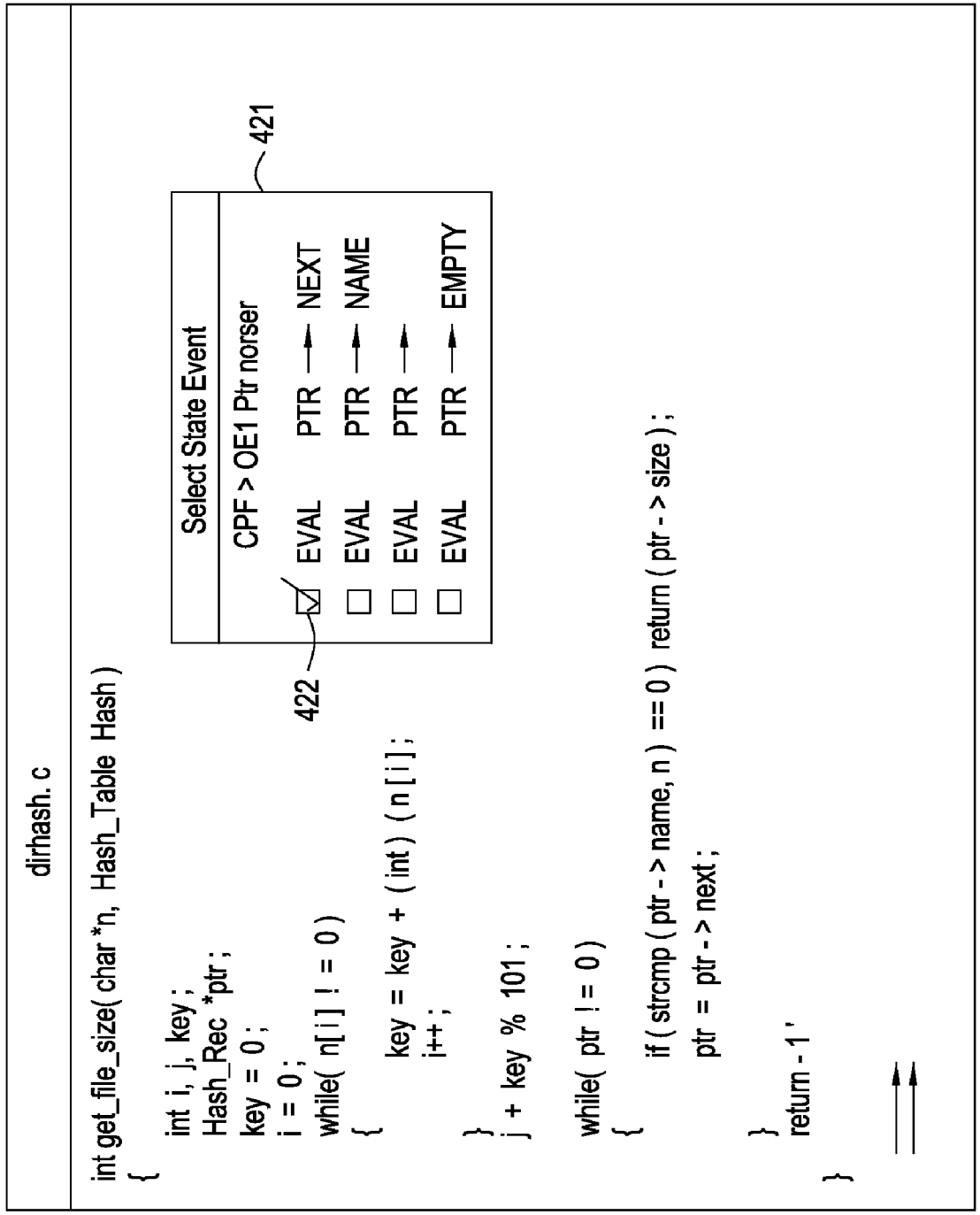
Figure 4C:
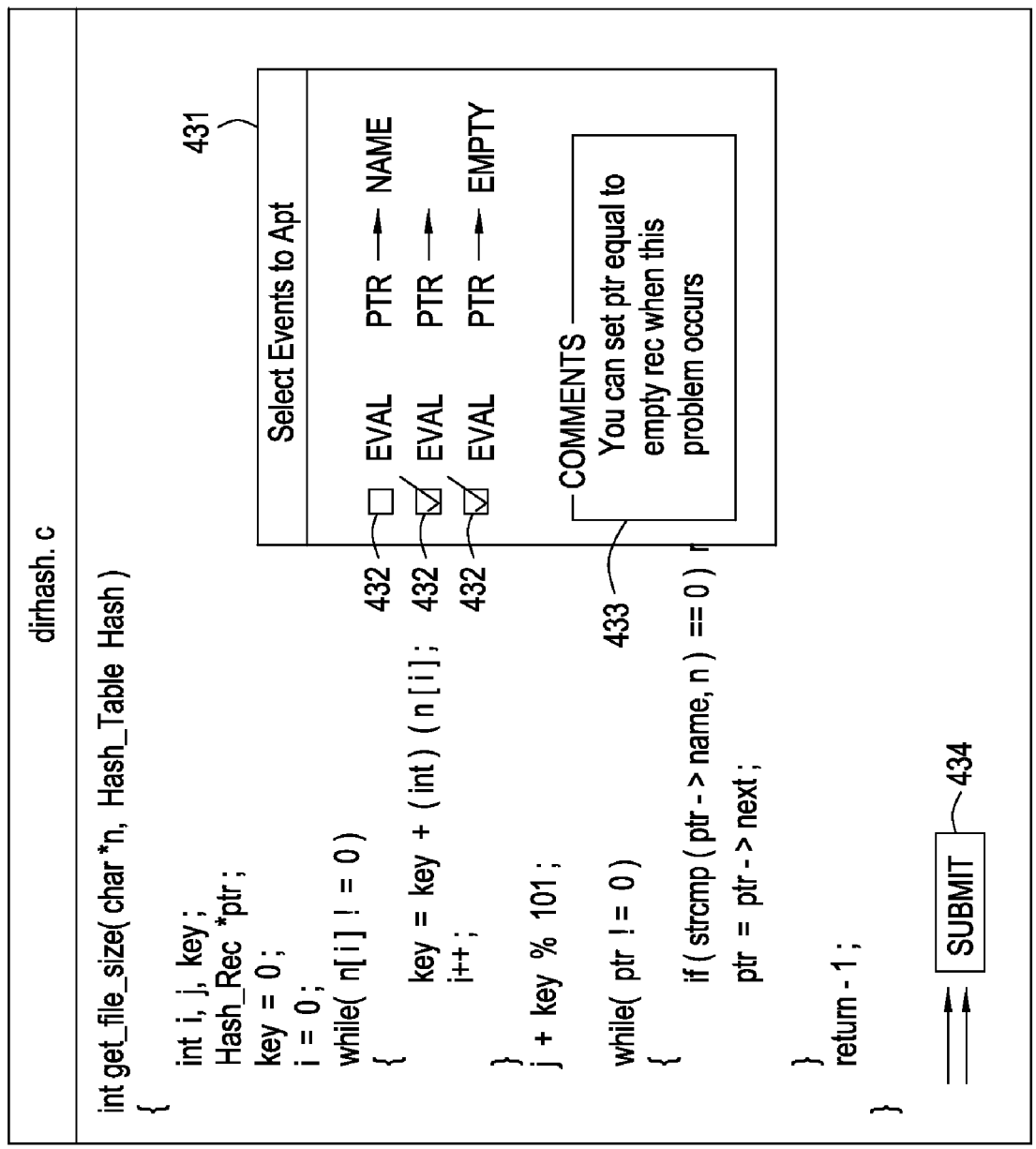

Now that a solution has been found to overcome the current error, the user can initiate the creation of the debug history record by responding to the Add History prompt 403 of FIG. 4A. In order to facilitate the creation of the debug record, the user is presented with the screen illustrated in FIG. 4B. A dialog box 421 containing several EVAL commands submitted during the debug session is presented. First, the user must choose the main state 422 from among all states saved in the temporary record for the current debugging session. The main state chosen will be the key value of the debug history record being created. In other words, the user needs to ensure that the current record will be returned as the result of a search based on the specified key value. In the current example, the source of the error is the evaluation of "ptr=ptr->next" statement. Therefore, the debug history record being created is based on the key value "EVAL ptr->next." The user is allowed to pick from all states that are related to the current error. For the current example, the user selects the main state by placing a check mark 422 next to the state that corresponds to the source of the error.

Next, another dialog box 431 (illustrated in FIG. 4C) is provided which allows the user to complete entering information pertaining to the new record. All EVAL commands 432 submitted in the current debug session are presented. The user can select any or all of the EVAL commands that should be saved in the debug history record. Further, a free-form text box 433 is provided for any additional comments. Entering this information is extremely important because it will provide valuable guidance for overcoming the current error. Access to this information will greatly improve the debugging process by drastically reducing the amount of time required to move past previously encountered errors. Once all information is entered, the user can click the Submit button 434 to request insertion of the record in the debug history repository.

Next, the user is presented with a confirmation screen, illustrated in FIG. 4D, which summarizes the contents of the newly created record. If satisfied with the record, the user can click on the Commit button 442 to permanently save the record in the debug history repository. However, if an error is found and modification of the record is necessary, the Cancel button 443 can be selected to return the user to the previous screen (illustrated in FIG. 4C) in order to make the appropriate changes.

Suppose that several weeks later another user encounters a stoppage due to the same "pointer not set" error associated with "ptr=ptr->next" and evaluates the expression ptr->next in the dirhash.c program. The screen illustrated in FIG. 4E is presented by the debugger. The screen contains an indicator 451 adjacent to the portion of code causing an error, and an error message 452 describing the error. Also included on the screen is a history indicator 453. This indicator is presented because upon encountering the error, the debugger is instructed to automatically query the debug history repository for a record that matches the current state. A record matching the current state (the record created in FIG. 4A-4D) was found. Accordingly, the history indicator is presented via the debug user interface.

Upon selecting the history indicator 453 of FIG. 4E, the user is presented with the screen illustrated in FIG. 4F. The contents of the debug history record corresponding to the state resulting from the error 461 is retrieved and presented to the user in a dialog box 462. The information presented proves to be extremely valuable to the user because it explicitly states how to identify and overcome the current error. The debug history record has allowed the user to forgo the task of identifying the specific cause of the error and the trial and error process required to identify a solution.

While the example described above (with reference to FIGS. 4A-4F) is related to debugging associated with a stoppage caused by an unmonitored exception, users may also refer to debug history records for analyzing states resulting from other types of stoppages. For instance, a user may want to analyze available debug history records matching the state at a particular breakpoint, watchpoint or other debugger controlled stoppage.

In addition to querying the debug history repository based on matching existing records with the current state, a user may also want to filter debug history records based on other attributes, such as the name of the developer that created the record, or the time during which the record was created. Facilities for allowing users to query the debug history repository based on a particular attribute are provided by the current invention.

The examples described above are presented in the context of procedural languages for purposes of clarity. However, those skilled in the art will recognize the methods described herein may be used with object oriented languages including Java and C++.

While the foregoing is directed to embodiments of the present invention, other and further embodiments of the invention may be devised without departing from the basic scope thereof, and the scope thereof is determined by the claims that follow.

What is claimed is:

1. A computer-implemented method for debugging code using a debugger comprising one or more interfaces for specifying debugger operations and displaying debug information, the method comprising:
at a halted position in the code:
accessing, via the debugger, a debug history repository comprising a plurality of history records each containing data describing code state information for a previously-encountered given state of the code;
determining whether a current state of the code matches a previously-encountered given state described in a history record in the debug history repository; and
providing an indication of the match to a user via the one or more interfaces whereby the user is allowed to view debug information contained in the history record corresponding to the match, the debug information describing at least an aspect of the previously-encountered given state, wherein the given state of the code is defined at least in part by an evaluation of a variable by a command which is separate from the code, the evaluation having been performed at the request of the user at the halted position.

2. The method of claim 1, wherein the given state of the code is one at which the code was halted following execution.

3. The method of claim 1, wherein providing the user the indication of the match comprises displaying a selectable graphical element which, when selected by the user through an input device, reveals the debug information contained in the history record corresponding to the match.

4. The method of claim 1, wherein the given state of the code is defined at least in part by a debugger control point encountered during execution of the code and having caused the code to be stopped by the debugger at the halted position.

5. The method of claim 1, wherein providing the user the indication of the match comprises displaying a series of previously performed variable evaluations by commands which are separate from the code performed during a previous stoppage of the code at the halted position.

6. A computer-implemented method for debugging code using a debugger comprising one or more interfaces for specifying debugger operations and displaying debug information, the method comprising:
at a halted position in the code:
accessing, via the debugger, a debug history repository comprising a plurality of history records each containing (i) data describing code state information for a given state of the code while stopped at a halted position and (ii) data describing a series of variable evaluations by commands which are separate from the code performed at the request of a user during a stoppage at a position in the code;
performing at least one evaluation of one or more variables in the code by a command which is separate from the code at the request of the user; and
for each evaluation: (i) determining whether a current state of the code matches a given state described in a history record in the debug history repository; and (ii) if so, providing a user an indication of the match via the one or more interfaces.

7. The method of claim 6, wherein providing the user the indication of the match comprises displaying a selectable graphical element which, when selected by the user through an input device, reveals the debug information contained in the history record corresponding to the match.

8. The method of claim 6, wherein providing the user the indication of the match comprises displaying the data describing the series of variable evaluations contained in the history record corresponding to the match.

9. The method of claim 6, wherein providing the user the indication of the match comprises displaying a selectable graphical element which, when selected by the user through an input device, reveals debug information contained in the history record corresponding to the match.

10. The method of claim 9, wherein the debug information comprises user commentary entered by the user as text using a text box describing debugging operations performed during a previous stoppage of the code while in a state matching the current state.

11. The method of claim 6, further comprising, after performing the at least one evaluation, displaying a user interface configured to allow the user to create a history record for the at least one evaluation.

12. The method of claim 11, wherein the user interface is configured to allow the user to specify a state to be associated with the history record to be created.

13. The method of claim 11, wherein the at least one evaluation comprises a plurality of evaluations by commands which are separate from the code performed at the request of a user and wherein the user interface displays the plurality of evaluations as selectable items from which the user is allowed to select in order to designate one of the plurality of evaluations as a main state for the history record to be created, wherein the main state is used to determine a match between the history record to be created and a subsequent state at a subsequent halted position in the code.

14. A computer readable storage medium containing a debugger program which, when executed, performs an operation to facilitate debugging of code, the operation comprising:
at a current halted position, at which execution of the code is suspended for the purpose of allowing a user to examine the code:
collecting state information related to the current halted position wherein the state information is defined at least in part by an evaluation of one or more variables by a command which is separate from the code, the evaluation having been performed at the request of a user at the halted position;
querying a debug history repository to determine whether a current state of the code at the current halted position matches a given state described in a history record in the debug history repository; and
if so, providing a user an indication of the match via the one or more interfaces.

15. The computer readable storage medium of claim 14, wherein the debugger program allows a user to enter a new record in the debug history repository if a matching record is not found.

16. The computer readable storage medium of claim 14, wherein the debugger program automatically creates a new record in the debug history repository if a matching record is not found.

17. A computer system for debugging code, comprising:
a computer readable storage medium including:

a debug history repository comprising a plurality of history records each containing data describing code state information for a given state of the code under debug wherein each history record further contains data describing a series of variable evaluations by commands which are separate from the code performed at the request of a user during a stoppage at a position in the code; and instructions for a debugger comprising one or more interfaces for specifying debugger operations and displaying debug information; a processor, which, when executing the instructions for the debugger, is configured to:

create the plurality of history records in the debug history repository;

access the plurality of history records in the debug history repository;

determine, at a given halted position in the code, whether a current state of the code matches a given state described in a history record of the plurality of history records; and if a matching state is determined, provide a user an indication of the match via the one or more interfaces while at the given halted position, whereby the user is allowed to view debug information contained in the history record corresponding to the match.

18. The computer system of claim 17, wherein the processor, when executing the instructions for the debugger, is configured to query the debug history repository based on available current state information.

19. The computer system of claim 17, wherein the processor, when executing the instructions for the debugger, is configured to provide the user the indication of the match by displaying a selectable graphical element which, when selected by the user through an input device, reveals debug information contained in the history record corresponding to the match.

20. The computer system of claim 17, wherein providing the user the indication of the match comprises displaying a selectable graphical element which, when selected by the user through an input device, reveals the debug information contained in the history record corresponding to the match and wherein the revealed debug information comprises user commentary entered by the user as text using a text box describing debugging operations performed during a previous stoppage of the code while in a state matching as the current state.

21. The computer system of claim 17, wherein the processor, when executing the instructions for the debugger, is further configured to perform at least one evaluation of one or more variables in the code by commands which are separate from the code at the request of the user at the halted position; and wherein the processor, when executing the instructions for the debugger, performs the determination of whether the current state of the code matches a given state described in a history record for each evaluation; and wherein, if the matching state is determined and the indication of the match provided, the user is allowed to view the data contained in the history record corresponding to the match and describing the series of variable evaluations performed during the stoppage at a position in the code.

22. The computer system of claim 17, wherein the processor, when executing the instructions for the debugger, is configured to display a user interface configured to allow the user to create a history record for the at least one evaluation.

23. The computer system of claim 22, wherein the user interface is configured to allow the user to specify a state to be associated with the history record to be created.

* * * * *